United States Patent [19]

De Schepper et al.

[11] 4,277,445
[45] Jul. 7, 1981

[54] APPARATUS FOR LIQUID-LIQUID EXTRACTION

[75] Inventors: Achille De Schepper, Lichtaart; Antoine Van Peteghem, Olen, both of Belgium

[73] Assignee: Metallurgie Hoboken-Overpelt, Brussels, Belgium

[21] Appl. No.: 912,989

[22] Filed: Jun. 6, 1978

[30] Foreign Application Priority Data

Jun. 7, 1977 [LU] Luxembourg .......................... 77498

[51] Int. Cl.³ ............................................. B01D 11/04
[52] U.S. Cl. ................................ 422/259; 423/658.5; 210/195.1; 210/195.3
[58] Field of Search ............... 210/523, 525, 320, 266, 210/195.1, 195.2, 195.3; 196/14.52; 423/658.5; 422/256, 259, 257, 236, 269, 278

[56] References Cited

U.S. PATENT DOCUMENTS

| | | | |
|---|---|---|---|
| 1,309,219 | 7/1919 | Ruth, Jr. | 209/169 |
| 2,285,697 | 6/1942 | Durdin | 210/195.3 |
| 2,415,650 | 2/1947 | McKee | 422/256 |
| 3,097,071 | 7/1963 | Lowes et al. | 422/259 |
| 3,140,924 | 7/1964 | McCormick et al. | 422/257 |
| 3,362,791 | 1/1968 | Ryon | 422/259 |
| 3,479,378 | 11/1969 | Orlandini et al. | 422/256 |
| 3,489,526 | 1/1970 | Elroy et al. | 422/259 |
| 3,844,723 | 10/1974 | Takahata et al. | 422/259 |
| 3,997,445 | 12/1976 | Hannestad | 422/256 |

FOREIGN PATENT DOCUMENTS

| | | | |
|---|---|---|---|
| 1619783 | 7/1971 | Fed. Rep. of Germany | 422/259 |
| 2082715 | 12/1971 | France | 422/259 |
| 2224187 | 10/1974 | France | 422/258 |
| 696114 | 8/1953 | United Kingdom | 422/259 |
| 1457185 | 12/1976 | United Kingdom | 422/256 |

Primary Examiner—Tim R. Miles
Assistant Examiner—Gregory N. Clements
Attorney, Agent, or Firm—Fred Philpitt

[57] ABSTRACT

A multistage liquid-liquid extraction apparatus of the mixer-settler type, which is especially suited for performing liquid-liquid extractions accompanied by the formation of a solid phase, comprises a vessel the side-wall of which defines a cylinder or a regular polygonal body, the vessel being divided by means of radial partitions into sectors, each sector comprising a mixer and a settler, and the mixers and the settlers being located near the side-wall of the vessel.

The agitators of the mixers are constituted by pumping turbines; the outlets of the mixers are constituted by weirs located near the side-wall of the vessel; means are provided for making the mixed liquids, discharged at the outlet of the mixers, flow by gravity towards a zone near the axis of the vessel; and the bottom of the vessel is inclined towards the axis of the vessel so as to define a reversed cone or pyramid.

11 Claims, 9 Drawing Figures

APPARATUS FOR LIQUID-LIQUID EXTRACTION

THE PRESENT INVENTION

The present invention relates to a multistage liquid-liquid extraction apparatus of the mixer-settler type comprising a vessel the side-wall of which defines a cylinder or a regular polygonal body, the vessel being divided by means of radial partitions into sectors, each sector comprising a mixer and a settler, and the mixers and the outlets of the settlers being located near the side-wall of the vessel.

The apparatus of this invention is especially suited for performing liquid-liquid extractions, accompanied by the formation of a solid phase. This is the case for instance, when extracting with tributyl phosphate, the arsenic present in the spent concentrated electrolyte from a copper electrorefining plant, where a precipitate of calcium sulphate is formed as a consequence of both volume reduction and cooling undergone by the hot electrolyte in contact with tributyl phosphate. The extraction of uranium from phosphoric acid solutions is another example of a liquid-liquid extraction process accompanied by the formation of a solid phase. In this case also a precipitate of calcium phosphate is formed.

In a multistage mixer-settler, each stage is formed of a mixer and a settler. The mixer is constituted essentially by a chamber provided with an inlet for the lighter fluid, an inlet for the heavier liquid, an agitator for mixing the two liquids and an outlet for evacuating the mixed liquids towards the settler. The settler is constituted essentially by a chamber provided with a settling zone in which the mixed liquids coming from the mixer separate by gravity, a weir for evacuating the lighter liquid and a siphon for evacuating the heavier liquid.

In the case of a two-stage mixer-settler, the heavier liquid enters into the apparatus through the mixer of the first stage, flows from the settler of the first stage into the mixer of the second stage, while the lighter liquid enters into the apparatus through the mixer of the second stage, flows from the settler of the second stage into the mixer of the first stage and leaves the apparatus through the settler of the first stage, or vice versa.

When the mixer-settler has more than two stages, the heavier liquid enters into the apparatus through the mixer of the first stage and leaves the apparatus through the settler of the last stage, while the lighter liquid enters into the apparatus through the mixer of the last stage and leaves the apparatus through the settler of the first stage, the mixer of the intermediate stage(s) receiving both the heavier fluid flowing from the settler of the preceding stage and the lighter fluid flowing from the settler of the next stage, or vice versa.

A liquid-liquid extraction apparatus with circle sectors of the type here-above is described in the French Pat. No. 1.028.143. This known apparatus has a flat bottom and within each sector the mixing of the two liquids is realized in a mixer by means of a centrifugal pump, which delivers the mixed liquids through a conduit to the next sector where the mixture arrives in a distributing chamber, for instance a box with perforated walls, located near the axis of the apparatus from where the mixture flows towards the side-wall of that sector, while separating itself into its constituents. As a result, on the one hand, mixing of the two liquids in the mixers of this known apparatus is too strong and on the other hand, the length of the settling path in the settlers of this apparatus does not exceed the radius of the apparatus.

Moreover, when the contact between the two liquids, which occurs in the apparatus, is accompanied by the formation of a solid phase, this latter will settle nearly everywhere on the bottom of the settlers, making the cleaning of the apparatus complicated and the continuous evacuation of the settled sludge impossible.

The apparatus of the present invention overcomes the above-mentioned drawbacks.

For this purpose, according to the invention, the agitators of the mixers are constituted by pumping turbines comprising a disc with blades attached at least on the bottom and known per se, the outlets of the mixers are constituted by weirs located near the side-wall of the vessel, means are provided for making the mixed liquids, discharged at the outlet of the mixers, flow by gravity towards a zone near the axis of the vessel, and the bottom of the vessel is inclined towards to axis of the vessel so as to define a reversed cone or pyramid.

Said means may be constituted by a baffle extending in the settlers from the outlet of the mixers to said zone, so that the liquids leaving the settlers are directed towards said zone and from there to the outlets of the settlers.

This baffle extends preferably over a distance comprised between 0.4 and 0.8 times the distance between the outlet of the mixers and the axis of the vessel.

Said means may also be constituted by a launder extending above the settlers, from the outlet of the mixers unto said zone.

It is advantageous to provide at the inlet of the channel, i.e. near the outlet of the mixers, an emulsion breaker, for instance an emulsion breaker with double gate.

It is also advantageous to foresee at the outlet of the launder, i.e. at its end located on the side of the above mentioned zone, an edge preferably with a height of at least 5 mm, so as to lengthen the time during which the liquids remain in the launder, and beneath the outlet of the launder, a baffle dipping into the underlying settler and forcing the liquids leaving the launder, to flow towards the lower part of said zone, before they flow towards the outlets of the settlers. Preferably said baffle extends downwards over a distance comprised between 0.15 and 0.6 times the distance between the centre of the outlet of the launder and the vertical projection of that centre of the bottom of the vessel, less the height of the possible edge.

The inclination of the bottom of the vessel has to be adapted to the nature of the solid phase formed during the extraction. For a coarse and readily settling precipitate, an inclination of 10° with respect to the horizontal may be sufficient. However, for a fine and uneasily settling precipitate an inclination of 40° with respect to the horizontal may be necessary.

The apparatus of the invention is advantageously provided with means for bleeding the lower part of the vessel. It is for instance possible to foresee for each sector a tube dipping into the vessel near the axis of the latter and nearly to the bottom, said tube being connected to a suction device. Each sector may also be provided with a drain tap at its lower part near the axis of the vessel, so that the sludge accumulating in the lower part of the apparatus may be now and then or continuously evacuated without interrupting the working of the apparatus.

The following description of an embodiment of the invention, given as a non-limitative example, will help the better understanding of the invention and of its advantages.

This description refers to a six-stage extractor and is illustrated by the accompanying drawings, wherein:

THE DRAWINGS

Figure 7:
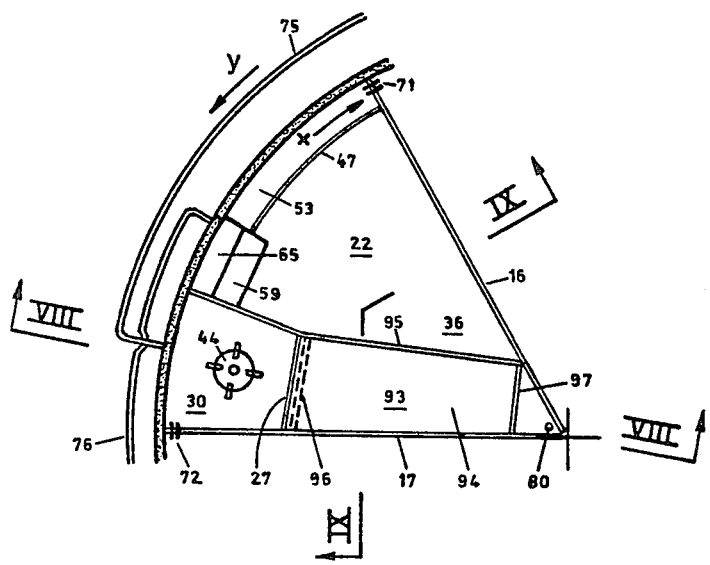
FIG. 7 is a sector of a variant of the extractor of FIG. 1.
Figure 8:
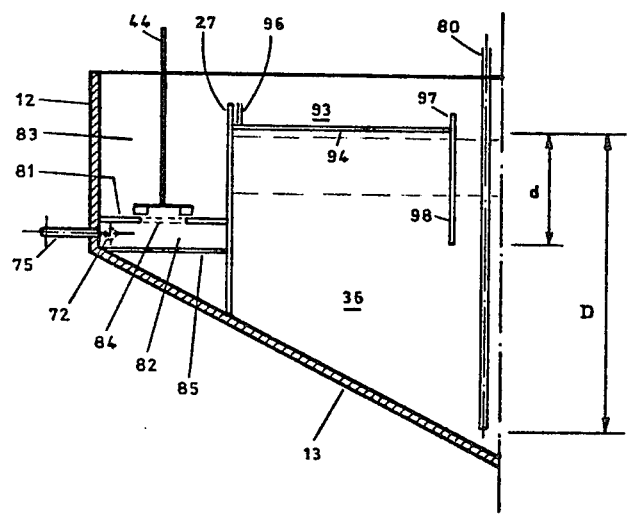
FIG. 8 is a sectional view taken along line VIII—VIII of FIG. 7.
Figure 9:
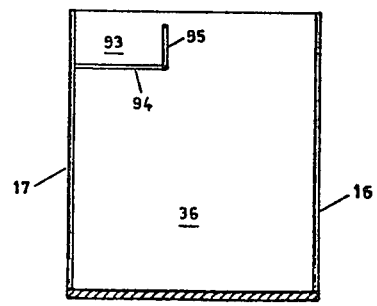

and FIG. 9 is a sectional view taken along line IX—IX of FIG. 7.

EMBODIMENT OF THE INVENTION

Figure 1:
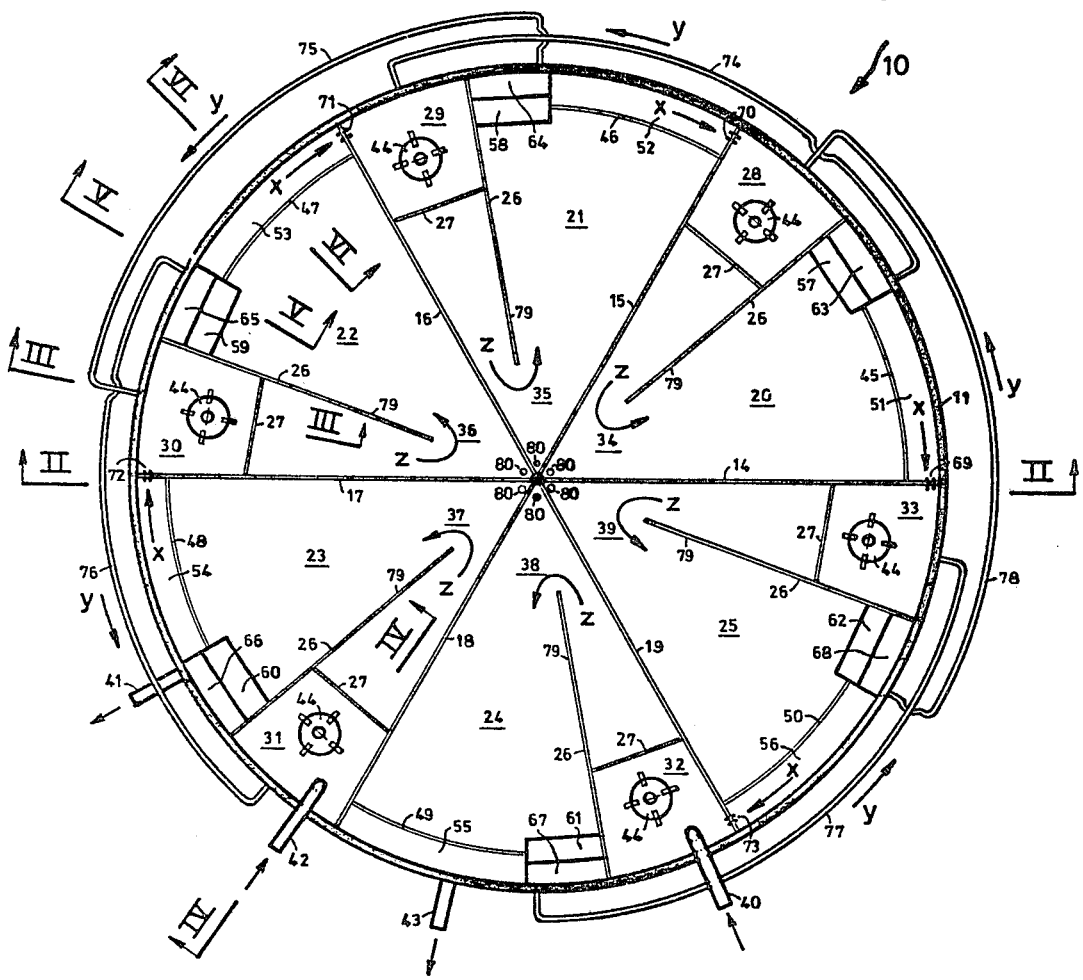
FIG. 1 is a plan view of the extractor.
Figure 2:
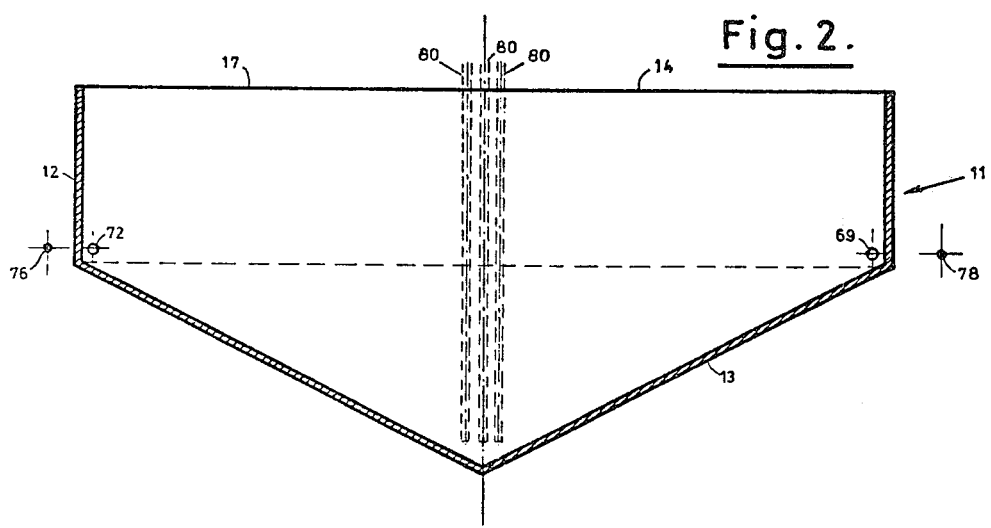
FIG. 2 is a sectional view taken along line II—II of FIG. 1.

Referring now to FIGS. 1 to 6 and more particularly to FIGS. 1 and 2, the extractor designated as 10 comprises a vessel 11, the side-wall 12 of which defines a cylinder and bottom 13 a reversed cone. Vessel 11 is divided by means of six radial partitions 14, 15, 16, 17, 18 and 19 into six mixer-settler units 20, 21, 22, 23, 24 and 25 of equal volume.

Each mixer-settler unit 20, 21, 22, 23, 24 and 25 in turn is divided, by means of partitions 26 and 27, into a mixer 28, 29, 30, 31, 32 and 33 and a settler 34, 35, 36, 37, 38 and 39, partitions 27 being lower than partitions 14, 15, 16, 17, 18, 19 and 26 so that they act as weirs determining the liquid level in the mixers.

The heavier liquid is fed to mixer 32 through conduit 40 and is withdrawn from settler 37 through conduit 41, while the lighter liquid is fed to mixer 31 through conduit 42 and is withdrawn from settler 38 through conduit 43.

Figure 3:
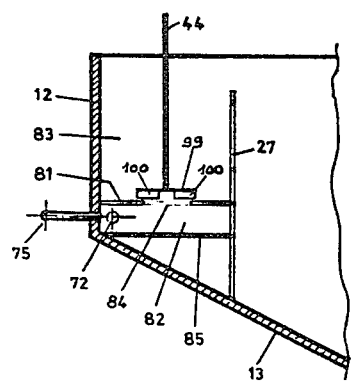
FIG. 3 is a sectional view taken along line III—III of FIG. 1.

Each of the mixers 28, 29, 30, 31, 32 and 33 is provided with a pumping agitator 44 comprising a disc 99 with six radial flat blades 100 attached on the bottom (see FIG. 3). Such an agitator is well known by those skilled in the art.

Each of the settlers 34, 35, 36, 37, 38 and 39 is provided with an outlet for the lighter liquid, constituted of a weir 45, 46, 47, 48, 49 and 50 and a downcomer 51, 52, 53, 54, 55 and 56 as well as with an outlet for the heavier liquid constituted of an adjustable siphon 57, 58, 59, 60, 61 and 62 and downcomer 63, 64, 65, 66, 67 and 68.

Downcomers 51, 52, 53, 54 and 56 are connected respectively through openings 69, 70, 71, 72 and 73 in partitions 14, 15, 16, 17 and 19, with the lower part of mixers 33, 28, 29, 30 and 32. Downcomer 55 is connected with discharge 43 for the lighter liquid.

Downcomers 63, 64, 65, 67 and 68 are connected respectively through conduits 74, 75, 76, 77 and 78 with the lower part of mixers 29, 30, 31, 33 and 28. Downcomer 66 is connected with discharge 41 for the heavy liquid.

As a result of the pumping action of agitators 44, the lighter liquid flows into downcomer 51, 52, 53, 54 and 56 in the direction of arrows X and the heavier liquid flows into conduits 74, 75, 76, 77 and 78 in the direction of arrows Y.

In each settler 34, 35, 36, 37, 38 and 39, partition 26 is lengthened so as to form a baffle 79, extending from weir 27 to the axial zone of vessel 11, over a distance equal to 60% of the distance between weir 27 and the axis of vessel 11. This baffle 79 forces the liquids coming from weir 27 to flow at first towards the axial zone of vessel 11 and from there to the outlets of the settlers, in the direction of the arrows Z. Since the axial zone of vessel 11 is the deepest of the vessel, the linear speed of the flowing liquids in the settlers becomes very low within this axial zone, which is very advantageous both for the separation of the two liquid phases and the settling of the solid phase.

Tube 80, foreseen in every settler near the axis of vessel 11, permits to bleed, now and then, by aspiration, the lower part of vessel 11 where the settled solids form a sludge.

FIG. 3 is a vertical sectional view of mixer 30. Mixer 30 is divided by means of horizontal partition 81 into a reception compartment 82 and a mixing compartment 83. Reception compartment 82, in which the lighter liquid is fed through opening 72 and the heavier liquid through conduit 75, is connected with mixing compartment 83 by means of an opening 84 in partition 81, beneath agitator 44. The bottom of the mixer is formed by horizontal partition 85. The upper edge of partition 27 acts as a fixed weir, but it is evident that an adjustable weir could be easily foreseen in 27, should this be necessary. Mixers 28, 29 and 33 are identical to mixer 30.

Figure 4:
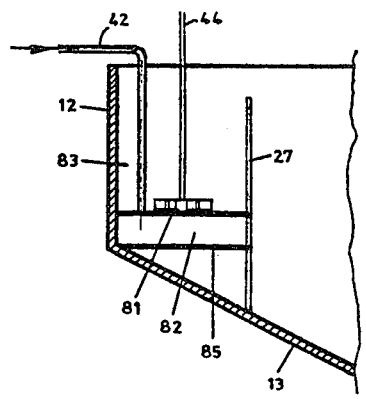
FIG. 4 is a sectional view taken along line IV—IV of FIG. 1.

FIG. 4 is a vertical sectional view of mixer 31. This latter differs from mixer 30 in that it receives the lighter liquid through conduit 42. Mixer 32 differs from mixer 30 in that it receives the heavier liquid through conduit 40, which is similar to conduit 42.

Figure 5:
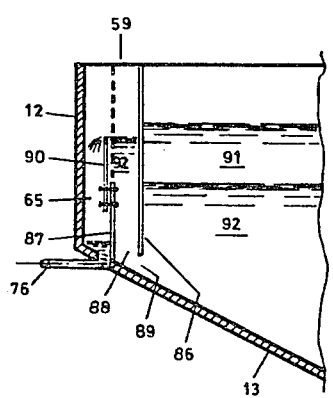
FIG. 5 is a sectional view taken along line V—V of FIG. 1.

FIG. 5 is a vertical sectional view of siphon 59 in action. This siphon 59 is formed of two vertical partitions 86 and 87 forming together compartment 88. Partition 86 is provided, near bottom 13 of the vessel, with an opening 89, so that compartment 88 and settler 36 form communicating vessels. Partition 87 is provided with an adjustable weir 90 by means of which the level of the interface between the lighter liquid 91 and the heavier liquid 92 in settler 36, may be controlled. The heavier liquid 92 in compartment 88 overflows weir 90 and is evacuated via downcomer 65 through conduit 76. Siphons 57, 58, 61 and 62 are identical to siphon 59. Siphon 60 differs from siphon 59 in that its associated downcomer 66 is connected to discharge 41 for the heavier liquid.

Figure 6:
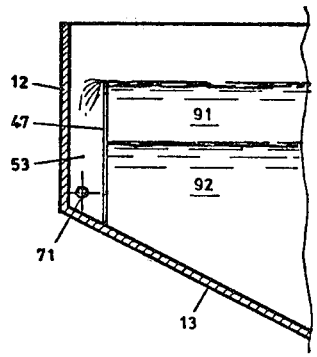
FIG. 6 is a sectional view taken along line VI—VI of FIG. 1.

FIG. 6 is a vertical sectional view of fixed weir 47 for the lighter liquid 91 and of its associated downcomer 53. It is obvious that an adjustable weir can be foreseen in 47, should this be necessary. Weirs 45, 46, 48 and 50 are identical to weir 47. Weir 49 differs from weir 47 in that its associated downcomer 55 is connected to discharge 43 for the lighter liquid.

In a variant of the above extractor, of which only one sector, corresponding to sector 22 of FIG. 1, is shown in FIG. 7, baffles 79 are replaced by launders 93. These launders 93 are formed of a horizontal bottom 94, a side-edge 95 and the radial partition adjacent to the mixer to which the launder is associated, i.e. partition 17 in the sector of FIG. 7. Launder 93 is provided at its inlet with a double gate emulsion breaker 96 known per se and at its outlet with an edge 97 and a baffle 98. It is obvious that the level of edge 97 must be lower than the level of weir 27. However a relatively good phase separation occurs already in launder 93, when the height of edge 97 is only about 5 mm.

Baffle 98 dips into the settler over a distance d comprised between 0.16 and 0.6 times distance D, for instance over a distance d equal to 0.4 distance D, thus forcing the solid phase to settle substantially in the axial zone of the vessel without creating however a too violent circulation in the lower part of the axial zone.

We claim:

1. A multi-stage liquid-liquid extraction apparatus of the mixer-settler type for carrying out extractions involving light and heavy phases accompanied by a solid phase settling comprising
   (a) a vessel, the essentially vertical side-walls of which define a cylinder or a regular polygonal body and the bottom of which is inclined downwardly from the side wall towards the central axis of the vessel so that the bottom resembles a reversed cone or pyramid;
   (b) a pluarality of partitions dividing the vessel into a plurality of sectors, said partitions extending radially outwardly from the central axis of the vessel to said sidewall;
   (c) a liquid mixing compartment located in each sector near the side-wall of the vessel, said compartment containing liquid inlet means for said light and heavy phases,
   (d) an agitator in each mixing compartment in the form of a pumping turbine for mixing the phases,
   (e) an outlet for each mixing compartment in the form of a weir that is located a spaced distance away from the side-wall of the vessel,
   (f) a liquid outlet compartment in each sector located near the side-wall of the vessel, said compartment containing two separate outlet means for discharging two separate liquid phases from said compartment,
   (g) guide means including a baffle wall in each sector extending from the outlet of the mixing chamber toward the central axis of the vessel for guiding the mixed phases from the weir of said mixing compartment towards a zone located near the central axis of the vessel and then in a nearly reverse direction outwardly towards said liquid outlet compartment, and
   (h) an outlet for solids adjacent to the apex of said reversed cone or pyramid.

2. An apparatus according to claim 1 in which said guide means comprises a radially extending baffle extending from the outlet of said mixing compartment toward said central axis.

3. An apparatus according to claim 2 in which said baffle extends over a distance of between 0.4 and 0.8 times the distance between the outlet of the mixing compartment and the central axis of the vessel.

4. An apparatus according to claim 1 in which said guide means consists of a launder extending from the outlet of the mixing compartment toward the central axis of said vessel.

5. An apparatus according to claim 4 in which said launder is provided with an emulsion breaker near the outlet of the mixing compartment.

6. An apparatus according to claim 4 in which said launder is provided with a raised edge at its end located closest to the central axis of the vessel.

7. An apparatus according to claim 6 in which the edge has a height of least 5 mm.

8. An apparatus according to claim 4 in which the launder is provided, beneath its end located closest to the central axis of the vessel, with a downwardly extending baffle that will force the liquids leaving the launder to flow towards the apex of said cone or pyramid before flowing towards said liquid outlet compartment.

9. An apparatus according to claim 8 in which said baffle extends downward over a distance of between 0.15 and 0.6 times the distance between the center of said end of the launder and the vertical projection of that center on the bottom of the vessel.

10. An apparatus according to claim 1 in which the bottom of the vessel has an inclination of 10° to 40° with respect to the horizontal.

11. An apparatus according to claim 1 in which means are provided for bleeding the lower part of the vessel.

* * * * *